United States Patent
Guarino (10) Patent No.: US 10,215,292 B2
(45) Date of Patent: Feb. 26, 2019

(54) SPOOL VALVE WITH SPECIAL METERING CONFIGURATION FOR HYDRAULIC VALVE MAIN CONTROL SPEED

(71) Applicant: Parker-Hannifin Corporation, Cleveland, OH (US)

(72) Inventor: Joshua Matthew Guarino, Plainfield, IL (US)

(73) Assignee: Parker-Hannifin Corporation, Cleveland, OH (US)

( * ) Notice: Subject to any disclaimer, the term of this patent is extended or adjusted under 35 U.S.C. 154(b) by 70 days.

(21) Appl. No.: 15/240,173

(22) Filed: Aug. 18, 2016

(65) Prior Publication Data

US 2017/0051836 A1   Feb. 23, 2017

Related U.S. Application Data (60) Provisional application No. 62/207,628, filed on Aug. 20, 2015.

(51) Int. Cl.
*F16K 11/07* (2006.01)
*F15B 13/00* (2006.01)

(52) U.S. Cl.
CPC ...... *F16K 11/0712* (2013.01); *F16K 11/0708* (2013.01); *F15B 2013/008* (2013.01); *Y10T 137/8671* (2015.04)

(58) Field of Classification Search
CPC .............. F16K 11/0712; F16K 11/0708; F15B 2013/008
See application file for complete search history.

(56) References Cited

U.S. PATENT DOCUMENTS 3,762,443 A * 10/1973 Sorenson ................ F15B 13/04
137/625.27
4,667,930 A *  5/1987 Latimer ................... F15B 13/04
137/596.13

(Continued)

OTHER PUBLICATIONS

Figure 3 taken from: Gillella P, Sun Z. Analysis and Synthesis of Spool Valves With Arbitrary Metering Area Variation. ASME. J. Dyn. Sys., Meas., Control. 2013;135(5):054503-054503-11. doi:10.1115/1.4024364.*

(Continued)

*Primary Examiner* — William M McCalister
*Assistant Examiner* — Patrick C Williams
(74) *Attorney, Agent, or Firm* — McDonnell Boehnen Hulbert & Berghoff LLP (57) ABSTRACT

A spool component for use in a spool valve has a cylindrical body including a first diameter portion and a second diameter portion, the first diameter portion having a diameter that is larger than a diameter of the second diameter portion. A metering notch is cut into the first diameter portion and extends toward the second diameter portion. The metering notch includes a first angle cut and a second angle cut that are sloped at different depth angles toward the first diameter portion. A spool valve assembly includes a housing defining a bore, and the spool component, which is moveable within the bore along a stroke distance comprising a metering band for metering a flow of fluid across the spool component. The metering notch provides precise metering of the flow of fluid across the spool component based on the different depth angles of the cuts in the metering notch.

14 Claims, 5 Drawing Sheets

(56) References Cited

U.S. PATENT DOCUMENTS

| | | | | |
|---|---|---|---|---|
| 4,862,920 A | * | 9/1989 | Cleasby | F15B 13/04 |
| | | | | 137/625.3 |
| 4,941,508 A | * | 7/1990 | Hennessy | F16K 11/0708 |
| | | | | 137/596.13 |
| 5,682,744 A | * | 11/1997 | Hasegawa | B62D 5/087 |
| | | | | 137/625.3 |

OTHER PUBLICATIONS

Figure 7 taken from: Gillella P, Sun Z. Analysis and Synthesis of Spool Valves With Arbitrary Metering Area Variation. ASME. J. Dyn. Sys., Meas., Control. 2013;135(5):054503-054503-11. doi:10.1115/1.4024364.*

* cited by examiner

SPOOL VALVE WITH SPECIAL METERING CONFIGURATION FOR HYDRAULIC VALVE MAIN CONTROL SPEED

RELATED APPLICATIONS

This application claims the benefit of U.S. Provisional Application No. 62/207,628, filed Aug. 20, 2015, which is incorporated herein by reference.

FIELD OF INVENTION

The present invention relates to spool valves, including spool valves for hydraulic fluid systems for controlling a flow of hydraulic fluid through such systems.

BACKGROUND OF THE INVENTION

Spool valves are used in a variety of applications for the control of the flow of a working fluid. Examples include spool valves used to control main fluid flow through a hydraulic fluid system, also known as hydraulic valve main control speed. Examples of hydraulic fluid systems that use spool valves for main control speed include the mobile or vehicle market, such as in hydraulic vehicle transmission systems. In a typical spool valve system, the spool component moves axially (along its long axis) within a bore that is defined by a pressure housing. The spool portion of the valve may include portions of differing diameter, such as a relatively smaller diameter portion that acts as a flow area permitting flow of fluid across the spool, and a relatively larger diameter portion that restricts or blocks the flow of fluid across the spool, thereby controlling the flow of fluid through the system. Fluid pressure within the valve housing moves the spool to varying positions so as to permit or block fluid flow as warranted.

In conventional spool valve systems, the spool includes a metering notch that opens into the flow area. In an open position, fluid flows across the metering notch from a first or source flow area into a second or downstream flow passage. The metering notch may be configured so as to control fluid flow across the spool valve in such manner. Conventional metering notches may include a singular stepped notch in the spool relative to the flow area and the restricted area. The size and depth of the notch determine the permissible flow rate. Such singular step notches, however, may provide inadequate control of the fluid flow in that they largely allow only one flow rate. Dual steps notches, therefore, have been utilized in an attempt to provide better control or different flow rates by using such multiple steps.

Figure 1:
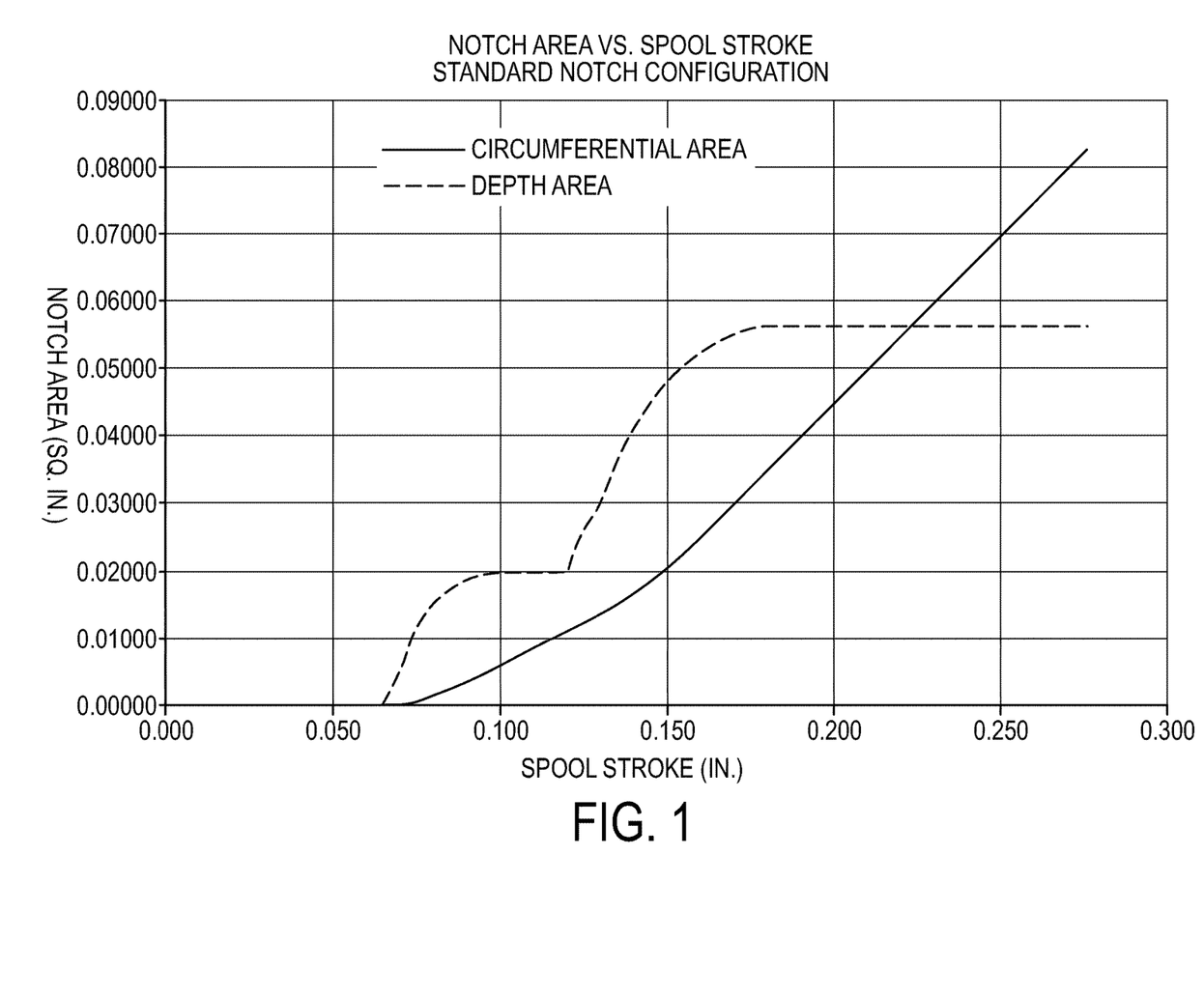
FIG. 1 is a graph depicting notch area versus spool stroke for a conventional spool valve configuration.

FIG. 1 is a drawing depicting a graphical representation of spool valve performance, showing notch area as a function of the spool stroke. The specific numerical values are intended to be exemplary and are provided only for illustrative purposes. As is known in the art, a metering notch is associated with two different areas, a depth area and a circumferential area. The circumferential area is a function of the cutter diameter and the distance that the cutter is translated. The depth area is a function of the cutter diameter and the depth that the cutter is plunged into the spool. The smaller of these two areas at any given position of the spool along its stroke distance provides the restrictive limit of the flow through the notch and into the downstream flow pathway. This controls and meters the flow based on the level of pressure applied to the spool, which corresponds to how far along the maximum stroke distance the spool moves. The range of stroke distance associated with the control of fluid flow also is referred to as the metering band of the spool. With most styles of conventional notches, the circumferential area is the minimum area for the majority of the spool stroke over the metering band, which means the point at which the area plateaus (the maximum spool area) is set by adjusting the depth of the cutter. This is seen in the example of FIG. 1.

More specifically as seen in the example of FIG. 1, at about a stroke distance of approximately 0.07 in., the notch begins to permit flow across the spool. The top line at this portion of the graph shows the depth area, which is stepped corresponding to the dual notches described above. The depth area maximum is about 0.056 in$^2$ corresponding to the second notch. The circumferential area changes more gradually as the spool moves across its stroke. As the smallest area, the circumferential area controls the flow through the stroke distance up to about 0.225 in., after which the depth area controls as the smallest area. Furthermore, since the depth area is constant at such point, this represents the maximum flow up through the maximum stroke of about 0.27 in. The metering band in the example of FIG. 1, therefore, is about 0.2 in. (0.27-0.07).

Such a conventional configuration, however, has proven to be deficient under various circumstances of operation. The dual notched configuration is asymmetric, which results in imbalanced forces and differential leak paths that can occur across the spool. The imbalance causes friction between the spool and the bore in which the spool moves, which can lead to undesirable hysteresis. The increase in friction is a result of a normal force which is generated due to the difference in pressure on one side of the spool compared to the other side as the fluid leaks from one flow area defined by the bore to another across different overlap conditions. This occurs in conventional styles of notches when you need a small maximum spool area over the total usable metering band. Conventional notches experience this issue because of a need to stagger one notch from the other when using a two-step notch configuration. The staggered notches give the multiple slope area changes to control flow, but the result can be differential leakage across the spool. This would also occur if a single step notch is used for the same reasons as the staggered step notches. Hysteresis undermines the performance of the spool valve system, and in severe circumstances could result in binding of the spool valve.

To overcome such deficiencies, spools alternatively have been configured with a single notch with an angled cut rather than one or dual straight cut notches. The angled cut notch meters by proportionally opening a small area over a longer spool stroke. In other words, the angled cut provides a gradually expanding opening to increase the flow over range of the spool stroke. Although an angled cut notch configuration lacks some of the above issues associated with step notches, fine control is difficult with only one angle to meter the flow (as compared to the multiple steps).

SUMMARY OF THE INVENTION

The present invention provides an enhanced spool valve configuration for controlling a flow of a working fluid, for example hydraulic fluid that flows through any suitable hydraulic fluid system. This spool component of the spool valve system has a specialized metering notch for a hydraulic valve main control speed used in the mobile or vehicle marketplace. The spool includes at least two angle cut notches with different angular cuts from the outer diameter of the spool to a predetermined depth. The first angle cut notch may be a shallow angle cut. The shallow angle cut may be preceded by an initial plunge cut from the same diameter tool used to make the first angle cut. The second angle cut is contiguous with and extends from the first angle cut. The second angle cut may be a deeper angle cut that has a larger depth angle relative to the first angle cut.

A rate of area change between the first and second angle notch cuts provides precise metering of the fluid flow, such as flow through a vehicle transmission system. The metering of the flow from the first angle cut may extend from a start of movement to roughly 50% of the usable spool stroke (also referred to as the metering band), and then the second angle cut allows rapid yet controlled movement to reach full speed at the maximum stroke distance. This specialized metering notch allows optimal vehicle control by providing a gradual change in area over a relatively long spool stroke, while not limiting the maximum speed nor compromising the controllability.

An aspect of the invention, therefore, is a spool component for use in a spool valve assembly. In exemplary embodiments, the spool valve component includes a cylindrical body including a first diameter portion and a second diameter portion, the first diameter portion having a diameter that is larger than a diameter of the second diameter portion. A metering notch is cut into the first diameter portion and extends toward the second diameter portion. The metering notch has a first angle cut and a second angle cut, wherein the first angle cut and the second angle cut are sloped at different depth angles toward the first diameter portion. The second depth angle is greater than the first depth angle.

Another aspect of the invention is a spool valve assembly. In exemplary embodiments, the spool valve assembly includes a housing defining a bore and the spool component, which is moveable within the bore along a stroke distance comprising a metering band for metering a flow of fluid across the spool component. The metering notch meters the flow of fluid across the spool component based on the depth angle of the first and second angle cuts. The bore and the second portion of the spool component define a flow area, and the housing defines another flow passage. The metering notch meters the flow of fluid across the spool component from the flow area to the flow passage. A depth area of the metering notch controls metering the flow of fluid from the flow area to the flow passage over essentially the entire stroke distance. In addition, leakage paths between the flow area and the flow passage across the first portion of the spool component are uniform on opposite sides of the spool component.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Embodiments of the present invention will now be described with reference to the drawings, wherein like reference numerals are used to refer to like elements throughout. It will be understood that the figures are not necessarily to scale.

Figure 2:
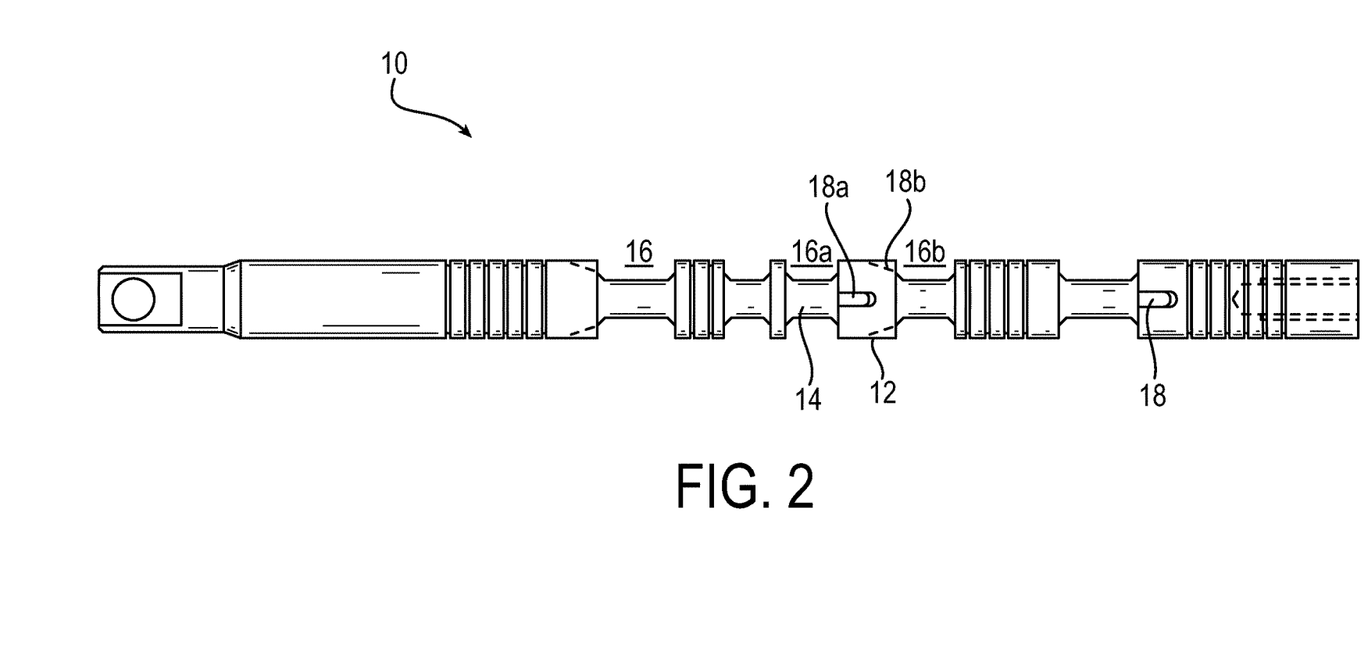
FIG. 2 is a drawing depicting a side view of an exemplary spool for a spool valve system in accordance with embodiments of the present invention.

FIG. 2 is a drawing depicting a side view of an exemplary spool component 10 for use in a spool valve system in accordance with embodiments of the present invention. The spool 10 has a generally cylindrical body that is divided into multiple portions, including a first diameter portion and a second diameter portion, the first diameter portion having a diameter that is larger than a diameter of the second diameter portion. As depicted in FIG. 2, the spool 10 may include relatively large diameter portions 12 and relatively small diameter portions 14. In the example of FIG. 2, there is more than one of each of the large and small diameter portions, and the precise number of each of the large and small diameters portions may be varied as needed depending upon the precise application.

The spool 10 is configured to be moveable along a bore in an axial (long axis) direction corresponding to a stroke distance of the spool. In use within a bore of a spool valve pressure housing, the large diameter portions 12 are configured to restrict fluid flow across the spool, and the small diameter portions 14 are configured to define flow areas 16 that permit fluid flow across the spool. The level of pressure within the housing is determinative of the position of the spool along its stroke distance. At varying positions, either the large diameter portions or the small diameter portions are in fluid communication with a fluid flow to the spool valve. In particular, when the large diameter portions are in fluid communication with the fluid flow, the fluid flow is blocked as the fluid flow cannot flow across the spool. Conversely, when the small diameter portions are in fluid communication with the fluid flow, the fluid flow is permitted as the fluid flow is able to flow into the flow areas around the small diameter portions and across the spool.

The spool 10 further includes one or more metering notches 18 that each is cut into the first diameter portion 12 and extends toward the second diameter portion 14. Each metering notch opens into a flow area 16, such that fluid can flow from the flow area 16 into the metering notch 18. The precise number of metering notches 18 also may be varied as needed depending upon the precise application, in correspondence with the number of flow areas 16. The spool component may include a plurality of smaller second diameter portions 14, and a corresponding plurality of metering notches 18 are cut into the first diameter portion and extend toward each respective second diameter portion. The metering notches 18 may be cut into the large diameter portions 12 to be contiguous and in fluid communication with the flow areas 16, and be spaced around the diameter of the spool. In the example of FIG. 2, some of the metering notches are seen from a top view while others of the notches are seen from a side view. For example, metering notch 18*a* is seen from a top view, being in fluid communication with flow area 16*a*. In addition, metering notch 18*b* is seen from a side view, being in fluid communication with flow area 16*b*.

Figure 3:
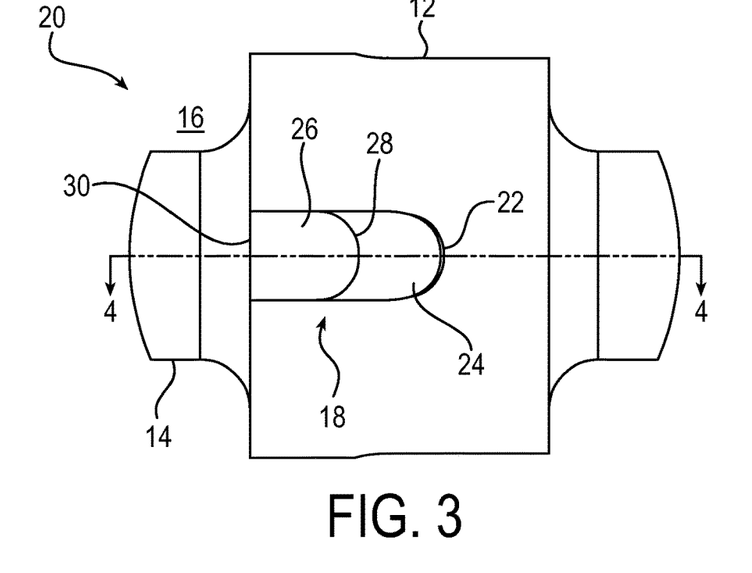
FIG. 3 is a drawing depicting a close-up view of a notched portion of the spool of FIG. 2.

FIG. 3 is a drawing depicting a close-up view of a portion 20 of the spool 10 of FIG. 2, the portion 20 including a notch 18. As better seen in FIG. 3, the notch 18 is cut into the large diameter portion 12, and extends to the small diameter portion 14. The notch opens into the flow area 16 that is located around the small diameter portion 14, such that fluid can flow into the notch 18 from the flow area 16. In exemplary embodiments, the notch 18 includes or is formed of an initial plunge cut 22, a first angle cut 24, and a second angle cut 26. The initial plunge cut is a slight cut into the large diameter portion 12 of the spool and is cut adjacent to the first angle cut 24. The first angle cut 24 extends from the plunge cut 22 to a break line 28. The break line 28 essentially is a transition line between the first angle cut 24 and the second angle cut 26. The second angle cut 26 extends from the break line 28 to a boundary face 30 that constitutes a step or ridge at which the large diameter portion 12 meets the small diameter portion 14. In the above configuration, therefore, the first angle cut extends from the plunge cut to the break line, and the second angle cut extends from the break line to the boundary face. In this manner, the notch 18 opens into the flow area 16, and specifically the second angle cut opens into the flow area 16 such that fluid can flow into the notch 18 from the flow area 16.

Figure 4:
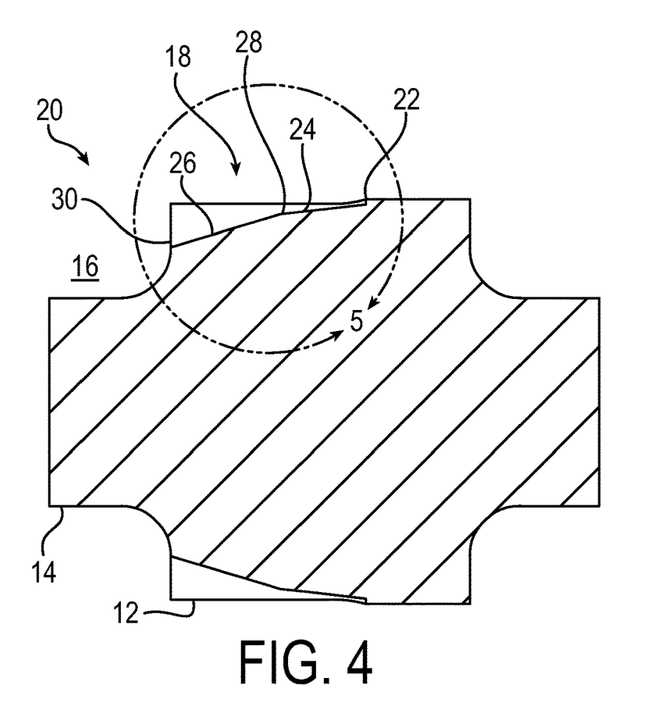
FIG. 4 is a drawing depicting a side cross-sectional view of the notch portion of the spool along the line 4-4 in FIG. 3.
Figure 5:
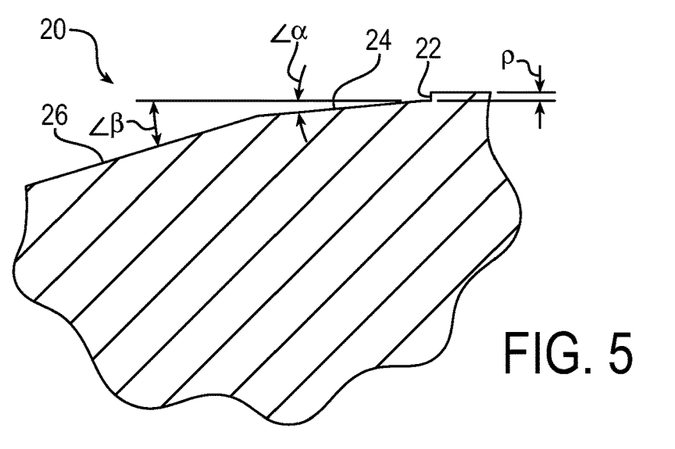
FIG. 5 is a drawing depicting a close-up view along the line 5-5 showing the angle cuts of FIG. 4.

FIG. 4 is a drawing depicting a side cross-sectional view of the notched portion 20 of the spool along the line 4-4 in FIG. 3. FIG. 5 is a drawing depicting a close-up view along the line 5-5 showing the area of the notch portion view of FIG. 4 that includes the plunge and angle cuts. As seen particularly in FIG. 5, the initial plunge cut 22 is cut into the outer diameter portion 12 of the spool by an exemplary amount ρ. The initial plunge cut is made as a manufacturing enhancement because it is difficult to meter a flow out to the full outer diameter of the spool. The initial plunge cut, therefore, provides a defined and exact metering starting point for the metering band of the spool.

In exemplary embodiments, the first angle cut and the second angle cut are sloped at different depth angles toward the first diameter portion. As referenced above, the first angle cut 24 is cut from the plunge cut 22 to the break line 28. The first angle cut 24 may be sloped with an exemplary first depth angle α relative to the base of the plunge cut 22, as seen in FIG. 5. The second angle cut 26 is cut from the break line 28 to the boundary face 30, extending to the flow area 16. The second angle cut 26 may be sloped with an exemplary second depth angle β, different from the first angle α, relative to the base of the plunge cut 22, as also seen in FIG. 5. In exemplary embodiments, the second depth angle β is greater or deeper than the first depth angle α. It will be appreciated that the parameters ρ, α, and β as depicted in FIG. 5 illustrate an exemplary relative configuration of the plunge cut and the first and second angle cuts. The relative nature of these parameters may be varied, and the precise numeral values for these parameters also may be varied, as warranted for any particular application.

The first and second angle cuts, therefore, combined extend a lateral distance from the plunge cut 22 to the boundary face 30, which defines the spool stroke distance or metering band. In exemplary embodiments, as best seen in FIG. 4, the metering of the flow from the first angle cut may extend from a start of movement from the plunge cut to roughly 50% of the stroke distance or metering band, and then the second angle cut allows rapid yet controlled movement for the second or remaining 50% of the stroke distance or metering band to reach full speed at the maximum stroke distance. This specialized metering notch allows optimal vehicle control by providing a gradual change in area over a relatively long spool stroke, while not limiting the maximum speed nor compromising the controllability.

Figure 6:
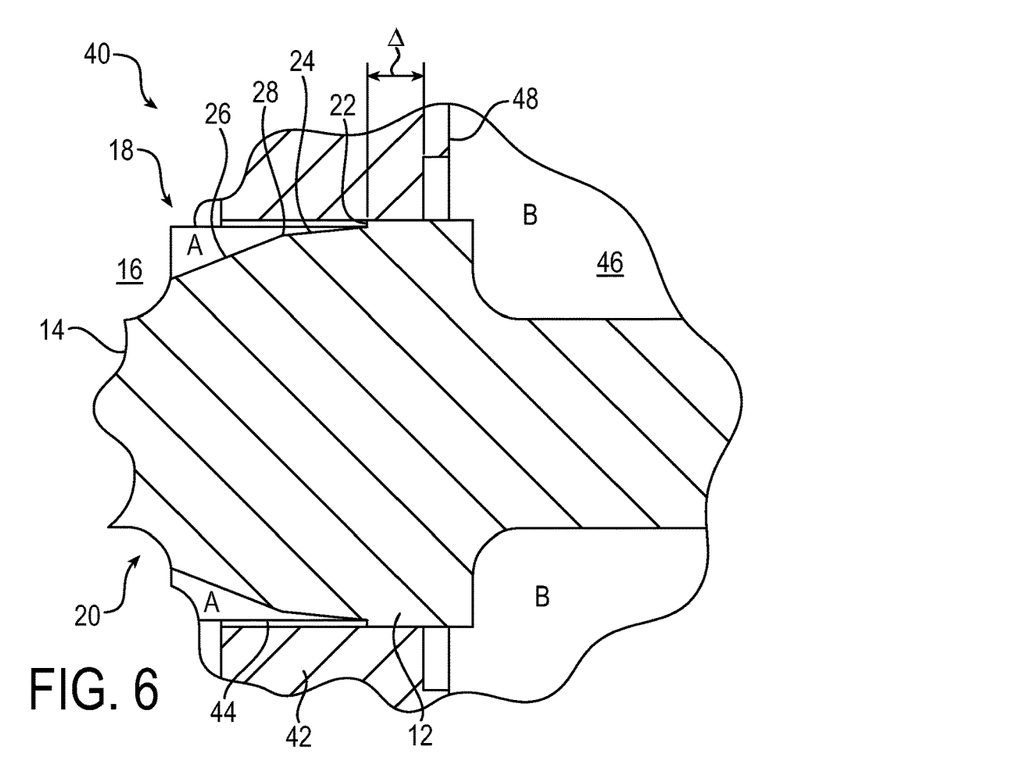
FIG. 6 is a drawing depicting a portion of an exemplary spool valve assembly in accordance with embodiments of the present invention.

FIG. 6 is a drawing depicting a portion of an exemplary spool valve assembly 40 in accordance with embodiments of the present invention. FIG. 6 depicts a particular portion of such spool valve assembly so as to demonstrate the operation of the spool with a dual angle cut configuration. The spool valve assembly 40 includes the spool portion 20 described above with respect to FIGS. 3-5. In particular, the spool portion 20 includes the outer diameter portion 12, and the inner diameter portion 14 that defines the flow area 16. The notch 18, including the plunge cut 22, first angle cut 24, and second angle cut 26, along with the break line 28 and boundary face 30, further are depicted in FIG. 6.

The spool valve assembly further includes a pressure housing 42 that defines a bore 44. The bore 44 defines a space in which the spool moves axially along its long axis (between left and right in FIG. 6). The spool component is moveable within the bore along a stroke distance comprising a metering band for metering a flow of fluid across the spool component. The bore and the second portion of spool component define the flow area 16 referenced above, and the housing defines another flow passage 46 as shown in FIG. 6. The metering notch meters the flow of fluid across the spool component from the flow area 16 to the flow passage 46. As shown in FIG. 6 in particular, the spool portion 20 is operative to meter a flow of fluid from the flow area 16 referenced above (and designated as area "A" in FIG. 6), to a second flow area or flow passage 46 (designated as area "B" in FIG. 6) that is defined by the housing 42. In particular, a forward flow of fluid enters the notch 18 from the flow area 16, creating a pressure differential that tends to move the spool portion 20 within the bore 44 along a stroke distance toward the flow passage 46.

If the pressure applied across notch is high enough, the spool portion 20 moves along the stroke distance until the initial plunge cut passes a side face 48 of the housing 42. The notch 18, therefore, is now in fluid communication with the fluid passage 46 so as to provide a fluid communication pathway from the flow area 16, through the notch 18, into the flow passage 46. Initially, the flow rate is controlled by the flow area permitted by the first angle cut 24. As the spool portion 20 moves along its stroke distance (to the right in FIG. 6) under increasing pressure, a wider and wider portion of the first angle cut 24 comes into fluid communication with the flow passage 46, thereby permitting more flow. In this manner, flow can be controlled by pressurizing the pressure housing 42 in an amount so as to move the spool portion along its stroke distance within the bore until the desired flow area is achieved, as controlled by the area of the angle cuts in the notch. In this manner, a fine control of flow is attained based on the positioning of the spool portion along a larger metering band as compared to conventional configurations.

As the pressure is increased to move the spool portion further along its stroke distance, eventually the break line 28 moves passed the side face 48 of the housing 42. After such position, the flow rate becomes controlled by the flow area permitted by the second angle cut 26, which having the greater or deeper depth angle β, permits both a greater flow rate and a greater rate of change to the increase of flow as compared to the first angle cut 24. As the spool portion 20 moves further along its stroke distance, a wider and wider portion of the second angle cut 26 comes into fluid communication with the flow passage 46, thereby permitting more flow until a maximum flow is reached when the widest portion of the second angle cut 26 comes into fluid communication with the flow passage 46.

As referenced in the background section above, a deficiency of conventional configurations results in imbalanced forces and differential leak paths that can occur across the spool. The imbalance causes friction between the spool and the bore, which can lead to undesirable hysteresis. FIG. 6 demonstrates how the configuration of the present invention avoids such deficiency. FIG. 6 illustrates a delta (Δ) region from the plunge cut toward the flow passage 46. In this region, fluid flow generally is blocked because the outer diameter of the spool essentially is commensurate with the inner surface of the bore in this portion of the valve assembly.

There is, however, some leakage between the A area and B area in FIG. 6 across the delta region. The fluid flow that moves the spool generates a pressure differential ΔP across spool between areas A and B over the delta region. The leakage path in the delta region in FIG. 6, however, is uniform on both or opposite sides of the spool, which results in ΔP also being uniform across the spool over the delta region. In other words, leakage paths between the flow area 16 and the flow passage 46 across the first portion 12 of the spool component are uniform on opposite sides of the spool component. This is not the case in the conventional stepped notch configuration, as the leakage paths and resultant ΔP across the delta region is different on opposites of the spool. The configuration of the present invention thus avoids the imbalances that may cause friction between the spool and the bore, thereby reducing the hysteresis effects experienced in conventional configurations.

Figure 7:
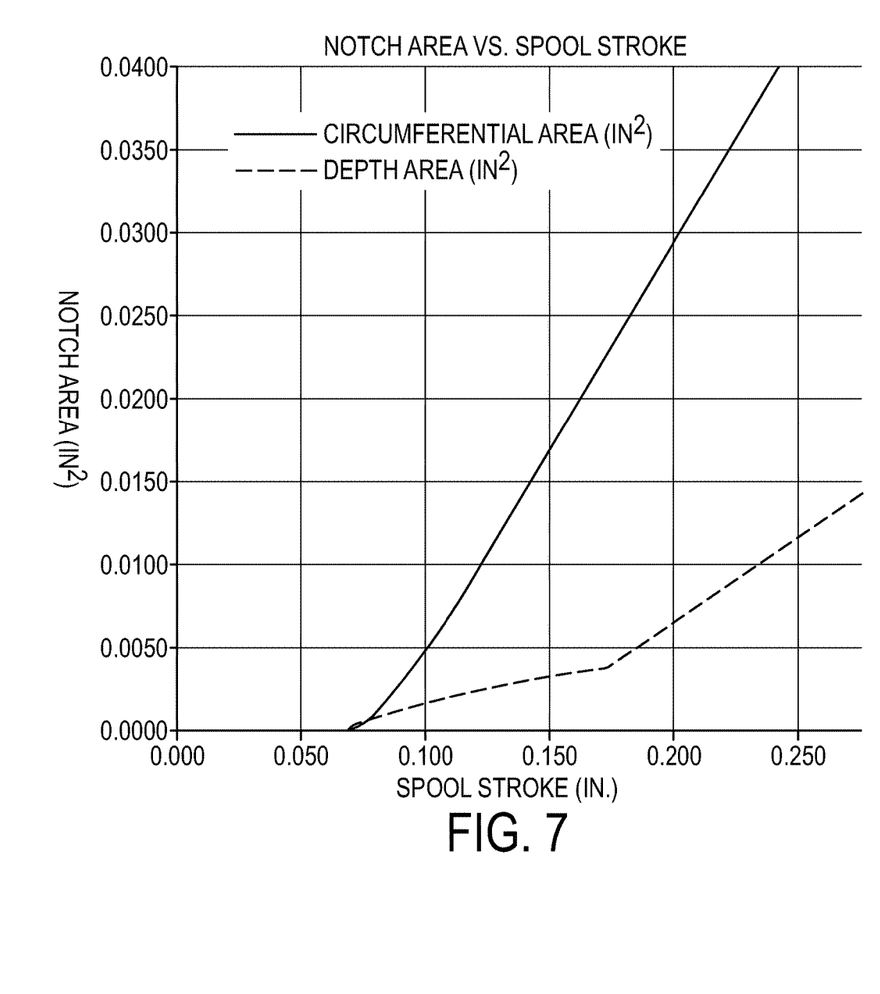
FIG. 7 is a graph depicting notch area versus spool stroke for a spool valve configuration in accordance with embodiments of the present invention.

FIG. 7 is a graph depicting notch area versus spool stroke for a spool valve configuration in accordance with embodiments of the present invention. It will be appreciated again that the specific numerical values are intended to be exemplary and are provided only for illustrative purposes. FIG. 7 may be compared to the similar graph of FIG. 1 for the conventional stepped notch configuration. As referenced above, a metering notch is associated with two different areas, a depth area and a circumferential area. The circumferential area is a function of the cutter diameter and the distance that the cutter is translated. The depth area is a function of the cutter diameter and the depth that the cutter is plunged into the spool. The smaller of these two areas at any given position of the spool along its stroke distance provides the restrictive limit of the flow through the notch and into a downstream flow passage.

As seen in FIG. 7, a depth area of the metering notch controls metering the flow of fluid from the flow area 16 to the flow passage 46 over essentially the entire stroke distance of the spool. As used herein, the phrasing "over essentially the entire stroke distance of the spool" means the entire stroke distance with the exception of a de minimis portion right at the plunge cut, which is depicted in FIG. 7. This is beneficial since the sloping of the first and second angle cuts permits fine control of the flow rate over nearly the entirety of the stroke distance. The angle cut of the first depth angle controls the flow rate from about 0.07 to just over 0.17 in. in the example of FIG. 7, where a break appears in the graph. This break represents the transition to flow rate control by the second angle cut at the second, greater depth angle. Comparing FIG. 7 to FIG. 1, in the conventional configuration of FIG. 1, the flow control is based on the circumferential area rather than the depth area over most of the stroke distance, which provides for less precise flow rate control as compared to the present invention. The configuration of the present invention relatedly has a longer total stroke distance or metering band as compared to conventional configurations.

In view of the above, the configuration of the present invention has several advantages over conventional configurations. The configuration of the metering notch of the present invention is less susceptible to differential leakage, thereby reducing the friction between the spool and the bore that otherwise leads to hysteresis and frictional backlash as experienced with conventional configurations. The configuration of the metering notch of the present invention further provides for easier design for a specific area throughout the metering band as compared to conventional styles of metering notches, and for a longer metering band with more precise control. In this regard, in the configuration of the metering notch of the present invention, the minimum area can be controlled by the depth area throughout essentially the entire spool stroke distance, so a specific desired area profile is more readily achieved. From a design standpoint, therefore, a designer can use standard cutter diameters instead of special tools and achieve the specific area profile by specifying cutter depth. This specialized metering notch thus allows optimal vehicle control by providing a gradual change in area over a relatively long spool stroke, while not limiting the maximum speed nor compromising the controllability.

An aspect of the invention, therefore, is a spool component for use in a spool valve assembly. In exemplary embodiments, the spool component includes a cylindrical body including a first diameter portion and a second diameter portion, the first diameter portion having a diameter that is larger than a diameter of the second diameter portion, and a metering notch that is cut into the first diameter portion and extends toward the second diameter portion. The metering notch includes a first angle cut and a second angle cut, wherein the first angle cut and the second angle cut are sloped at different depth angles toward the first diameter portion. The spool component may include one or more of the following features, either individually or in combination.

In an exemplary embodiment of the spool component, the metering notch further comprises a plunge cut that is cut adjacent to the first angle cut.

In an exemplary embodiment of the spool component, the metering notch further comprises a break line that is a transition line between the first angle cut and the second angle cut.

In an exemplary embodiment of the spool component, the spool component further includes a boundary face at which the first diameter portion meets the second diameter portion.

In an exemplary embodiment of the spool component, the first angle cut extends from the plunge cut to the break line, and the second angle cut extends from the break line to the boundary face.

In an exemplary embodiment of the spool component, the second depth angle is greater than the first depth angle.

In an exemplary embodiment of the spool component, the first angle cut extends a first 50% of the metering notch, and the second angle cut extends from the first angle cut a second 50% of the metering notch.

In an exemplary embodiment of the spool component, the spool component comprises a plurality of second diameter portions, and a corresponding plurality of metering notches are cut into the first diameter portion and extend toward each respective second diameter portion.

Another aspect of the invention is a spool valve assembly. In exemplary embodiments, the spool valve assembly includes a housing defining a bore and a spool component that is moveable within the bore along a stroke distance comprising a metering band for metering a flow of fluid across the spool component. The spool component includes a cylindrical body including a first diameter portion and a second diameter portion, the first diameter portion having a diameter that is larger than a diameter of the second diameter portion, wherein the first diameter portion blocks fluid flow across the spool component and the second diameter portion permits fluid flow across the spool component, and a metering notch that is cut into the first diameter portion and extends toward the second diameter portion for metering the flow of fluid across the spool component. The metering notch includes a first angle cut and a second angle cut, wherein the first angle cut and the second angle cut are sloped at different depth angles toward the first diameter portion. The spool valve assembly may include one or more of the following features, either individually or in combination.

In exemplary embodiment of the spool valve assembly, the bore and the second portion of spool component define a flow area; the housing defines a flow passage; and the metering notch meters the flow of fluid across the spool component from the flow area to the flow passage.

In exemplary embodiment of the spool valve assembly, a depth area of the metering notch controls metering the flow of fluid from the flow area to the flow passage over essentially the entire stroke distance.

In exemplary embodiment of the spool valve assembly, leakage paths between the flow area and the flow passage across the first portion of the spool component are uniform on opposite sides of the spool component.

In exemplary embodiment of the spool valve assembly, the metering notch further comprises a plunge cut that is cut adjacent to the first angle cut.

In exemplary embodiment of the spool valve assembly, the metering notch further comprises a break line that is a transition line between the first angle cut and the second angle cut.

In exemplary embodiment of the spool valve assembly, the spool valve assembly further includes a boundary face at which the first diameter portion meets the second diameter portion.

In exemplary embodiment of the spool valve assembly, the first angle cut extends from the plunge cut to the break line, and the second angle cut extends from the break line to the boundary face.

In exemplary embodiment of the spool valve assembly, the second depth angle is greater than the first depth angle.

In exemplary embodiment of the spool valve assembly, the first angle cut extends a first 50% of the metering band and the second angle cut extends from the first angle cut a second 50% of the metering band.

In exemplary embodiment of the spool valve assembly, the spool component comprises a plurality of second diameter portions, and a corresponding plurality of metering notches are cut into the first diameter portion and extend toward each respective second diameter portion.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A spool component for use in a spool valve assembly, the spool component comprising:
   a cylindrical body including a first diameter portion and a second diameter portion, the first diameter portion having a diameter that is larger than a diameter of the second diameter portion; and
   a metering notch that is cut into the first diameter portion and extends toward the second diameter portion,
   the metering notch comprising a first angle cut and a second angle cut, wherein the first angle cut and the second angle cut are sloped at different depth angles toward the first diameter portion, wherein respective magnitudes of the different depth angles are each constant and greater than zero degrees, wherein the metering notch has a consistent lateral width through an axial length of the first angle cut and through a respective axial length of the second angle cut, and wherein the metering notch further comprises a laterally arcuate transition line between the first angle cut and the second angle cut.

2. The spool component of claim 1, wherein the metering notch further comprises a plunge cut that is cut adjacent to the first angle cut.

3. The spool component of claim 2, further comprising a boundary face at which the first diameter portion meets the second diameter portion.

4. The spool component of claim 3, wherein the first angle cut extends from the plunge cut to the laterally arcuate transition line, and the second angle cut extends from the laterally arcuate transition line to the boundary face, and wherein the boundary face is perpendicular to side walls of the metering notch.

5. The spool component of claim 1, wherein a second depth angle of the second angle cut is greater than a first depth angle of the first angle cut.

6. The spool component of claim 1, wherein the first angle cut extends a first 50% of an axial length of the metering notch, and the second angle cut extends from the first angle cut a second 50% of the axial length of the metering notch.

7. The spool component of claim 1, wherein the spool component comprises a plurality of second diameter portions, and a corresponding plurality of metering notches are cut into the first diameter portion and extend toward each respective second diameter portion.

8. A spool valve assembly comprising:
a housing defining a bore; and
a spool component that is moveable within the bore along a stroke distance comprising a metering band for metering a flow of fluid across the spool component;
wherein the spool component comprises:
   a cylindrical body including a first diameter portion and a second diameter portion, the first diameter portion having a diameter that is larger than a diameter of the second diameter portion, wherein the first diameter portion blocks fluid flow across the spool component and the second diameter portion permits fluid flow across the spool component; and
   a metering notch that is cut into the first diameter portion and extends toward the second diameter portion for metering the flow of fluid across the spool component,
   the metering notch comprising a first angle cut and a second angle cut, wherein the first angle cut and the second angle cut are sloped at different depth angles toward the first diameter portion, wherein respective magnitudes of the different depth angles are each greater than zero degrees, wherein the metering notch has a consistent lateral width through an axial length of the first angle cut and through a respective axial length of the second angle cut, wherein the metering notch comprises (i) a plunge cut that is cut adjacent to the first angle cut, wherein the plunge cut comprises a laterally arcuate line, (ii) a break line that is a laterally arcuate transition line between the first angle cut and the second angle cut, and (iii) a boundary face at which the first diameter portion meets the second diameter portion, and wherein the first angle cut extends from the plunge cut to the break line, and the second angle cut extends from the break line to the boundary face.

9. The spool valve assembly of claim 8, wherein:
the bore and the second diameter portion of the spool component define a flow area;
the housing defines a flow passage;
and the metering notch meters the flow of fluid across the spool component from the flow area to the flow passage.

10. The spool valve assembly of claim 9, wherein a depth area of the metering notch controls metering the flow of fluid from the flow area to the flow passage over a stroke distance of the spool component.

11. The spool valve assembly of claim 9, wherein leakage paths between the flow area and the flow passage across the first diameter portion of the spool component are uniform on opposite sides of the spool component.

12. The spool valve assembly of claim 8, wherein a second depth angle of the second angle cut is greater than a first depth angle of the first angle cut.

13. The spool component of claim 8, wherein the first angle cut extends a first 50% of an axial length of the metering band and the second angle cut extends from the first angle cut a second 50% of the axial length of the metering band.

14. The spool valve assembly of claim 8, wherein the spool component comprises a plurality of second diameter portions, and a corresponding plurality of metering notches are cut into the first diameter portion and extend toward each respective second diameter portion.

* * * * *